United States Patent [19]
Sasaki et al.

[11] 4,076,889
[45] Feb. 28, 1978

[54] HEAT-INSULATION MATERIAL
[75] Inventors: Tohru Sasaki; Syuuzi Terasaki; Takao Ichii, all of Iwaki, Japan
[73] Assignee: Kureha Kagaku Kogyo Kabushiki Kaisha, Tokyo, Japan
[21] Appl. No.: 622,412
[22] Filed: Oct. 14, 1975
[30] Foreign Application Priority Data
  Nov. 21, 1974 Japan .................. 49-133196
[51] Int. Cl.² ............................................. B32B 15/08
[52] U.S. Cl. ................................. 428/333; 428/336; 428/337; 428/339; 428/421; 428/422; 428/463; 428/920
[58] Field of Search ............... 428/337, 421, 422, 457, 428/461, 913, 920, 921, 333, 336, 339, 463; 252/62, 66

[56] References Cited
U.S. PATENT DOCUMENTS

| 2,842,603 | 7/1958 | Miller | 252/66 X |
| 2,888,364 | 5/1959 | Bauer | 428/422 X |
| 3,217,083 | 11/1965 | Gore | 252/66 X |
| 3,240,825 | 3/1966 | Hauptschein et al. | 252/66 X |
| 3,318,850 | 5/1967 | Stilmar | 428/422 X |
| 3,567,521 | 3/1971 | Toy et al. | 428/422 X |
| 3,930,066 | 12/1975 | Ryan et al. | 427/79 |
| 3,930,109 | 12/1975 | Brandt et al. | 428/422 |
| 3,971,874 | 7/1976 | Ohta et al. | 428/432 |

Primary Examiner—Thomas J. Herbert, Jr.
Assistant Examiner—Bruce H. Hess
Attorney, Agent, or Firm—Lane, Aitken, Dunner & Ziems

[57] ABSTRACT

A method and laminate for protecting an article from exposure to radiant heat are disclosed. The laminate is formed by adhering a metal coating to one surface of a polymeric film of polyfluoroolefin or fluoroolefin copolymer, having not more than a 50% transmission ratio of visible ray and not less than a 30% transmission ratio of infrared ray. The laminate is adhered to a surface of the article to be protected with the polymeric surface outward.

10 Claims, 3 Drawing Figures

HEAT-INSULATION MATERIAL

FIELD OF THE INVENTION

The present invention relates to a method for protecting rolling stock, buildings, structures, chemical apparatus, piping and the like from direct exposure to radiant heat, and to a heat-insulation material which is used for covering interior or exterior surfaces for protection.

BACKGROUND OF THE INVENTION

For a long time, sheets of aluminum, silver and other metals have been used as heat-insulation materials to intercept radiant heat. More recently, so-called metallized plastic film which is obtained by depositing aluminum, zinc, silver or some other metal in the form of a thin layer by means of vacuum evaporation or plating on one surface of a transparent plastic film such as polyvinyl chloride or polyethylene terephthalate has also been used as a heat-insulation material. For effective use, the metallized plastic film is so positioned that the transparent plastic side of the film will face the radiant heat source. Thus, the mirror face of the metal layer reflects the radiant heat to provide the desired insulation.

With the sheet of metal or the metallized plastic film, the insulation is accomplished by causing the radiant heat to be reflected by the mirror face of metal layer as described above. When a building has an exterior surface covered with the sheet of metal or the metallized plastic film, for example, the solar ray impinging upon the mirror face of metal layer of the heat-insulation material is reflected and the reflected ray may have a dazzling effect on persons travelling persons travelling nearby. When the same heat-insulation material is used to cover an interior wall surface of a building, there has a disadvantage that the reflected ray tends to impart a feeling of aggravated fatigue to the occupants of the building.

SUMMARY OF THE INVENTION

The primary object of the present invention, therefore, is to provide a method for insulation whereby a given article is protected from exposure to radiant heat by having the incident radiant heat intercepted en route to the article.

The second object of the present invention is to provide a heat-insulation material which possesses an excellent heat insulating property and at the same time does not give a mirror-face reflection of radiant heat.

These objects and other objects of the present invention will become apparent from the following description of the invention. It has now been discovered that when a laminate is formed by depositing a metal on one surface of a translucent or opaque film of polyfluoroolefin or fluoroolefin copolymer having a specific transmission ratio of visible ray and a specific transmission ratio of infrared ray and this laminate is applied to an article with the metal lamina facing the surface to be protected (on the inside), the covered surface, though totally destitute of metallic gloss, can provide as effective insulation of radiant heat as when the insulation is effected by causing the radiant heat to be reflected by the mirror face of a metallized plastic film.

According to the present invention, therefore, there is provided a laminate composed of a film of polyfluoroolefin or fluoroolefin copolymer, having not more than a 50% transmission ratio of visible ray and not less than a 30% transmission ratio of infrared ray, and a metal layer deposited on one surface of the film.

DETAILED DESCRIPTION OF THE INVENTION

Figure 1:
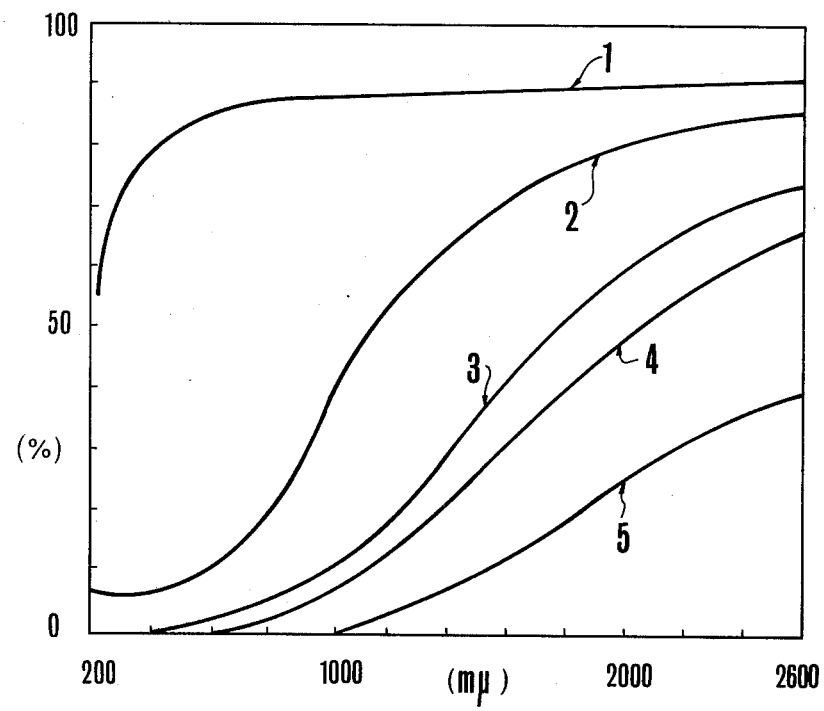
FIG. 1 is a graph illustrating the changes in transmission ratio of rays through polyvinylidene fluoride film having a fixed thickness of 35 $\mu$ and containing titanium dioxide in varying concentrations.

The film suitable for use in the present invention is a translucent or opaque film of polyfluoroolefin or fluoroolefin copolymer having not more a 50% transmission ratio of visible ray and not less than a 30% transmission ratio of infrared ray. This film can be obtained by adding to a polyfluoroolefin or fluoroolefin copolymer a substance having no compatibility therewith and forming the resultant mixture into a film. The polyfluoroolefin is a polymer obtained by polymerizing at least one fluoroolefin selected from the group consisting of vinyl fluoride, vinylidene fluoride, ethylene trifluoride, ethylene tetrafluoride, vinylidene fluorochloride, ethylene difluorochloride, ethylene trifluorochloride and propylene hexafluoride. Concrete examples include polyvinyl fluoride, polyvinylidene fluoride, polyethylene tetrafluoride and polyethylene trifluorochloride. The fluoroolefin copolymer is a copolymer obtained by polymerizing at least one of the fluoroolefins in conjunction with at least one other monomer. Examples include ethylene tetrafluoride-ethylene copolymer and vinylidene fluoride-ethylene copolymer. Of these thermoplastic synthetic resins, polyfluoroolefins which excel in weathering resistance and which absorb substantially no infrared ray are used particularly advantageously for the purpose of the present invention. Of the polyfluoroolefins, polyvinylidene fluorides and polymers obtained by polymerizing not less than 85% by weight of vinylidene fluoride and the balance of at least one other fluoroolefin are preferably used. These polyfluoroolefins prove to be advantageous from the standpoint of molding, for they readily permit production of transparent films. The substance which is added to the polyfluoroolefin or fluoroolefin copolymer and which lacks compatibility with the resin is preferred to be of a type substantially incapable of absorbing infrared rays and heat rays. For the incompatible reason, this substance is most preferably colorless or white. Examples of substances which may be cited as satisfying this requirement include substantially water-insoluble inorganic compounds such as titanium dioxide, zinc oxide, aluminum oxide, calcium carbonate, gypsum, magnesium oxide and calcium sulfite, and resins such as polyethylene tetrafluoride, polyvinylidene fluoride, polyvinyl fluoride and polyvinyl chloride which are not compatible with the basal resin. The film obtained by adding the substance to the polyfluoroolefin or the fluoroolefin copolymer and molding the resultant mixture in the form of film is required to provide an average transmission ratio of not more than 50%, preferably 30%, of visible ray (4,000 A to 8.000 A in wavelength). The average transmission ratio is the value obtained by dividing the area of the graph indicating a given transmission ratio of the ray of wavelengths between 4,000 A and 8,000 A by the whole area of 100% transmission ratio of the ray of wavelengths between 4,000 A and 8,000 A. If the film is colorless and the ray absorption spectrum has no conspicuous peak in the neighborhood of 6,000 A, then the transmission ratio of the ray of a wavelength of 6,000 A may be used as an approximate value. Further, the film is required to pass most of the infrared ray and heat ray, direct or scattered, and absorb practically none of them. To be more specific, the film is required to permit passage of not less than 30% of infrared ray having a wavelength of not less than 25,000 A. In order to obtain a film having not more a 50% transmission ratio of visible ray and not less than a 30% transmission ratio of infrared ray, the proportion in which the incompatible substance is added to the polyfluoroolefin or the fluoroolefin copolymer may generally fall in the range of from 0.5 to 50 parts by weight based on 100 parts by weight of the resin, although the proportion is usually affected by the kind and particle size of the substance, the compatibility of the substance with the resin, the color of the resin, etc. In the addition of the incompatible substance to the polyfluoroolefin or the fluoroolefin copolymer, a pigment, a dyestuff or some other coloring agent which is compatible with the resin may simultaneously be incorporated into the resin for the purpose of imparting a decorative effect to the resultant film or for the purpose of imparting an identifying color. If a coloring agent is added, it is preferred to be of a light color so that possible adsorption thereby of heat ray will be relatively small. If the incompatible substance is transparent, then the resultant film will be white. Where a white film is to be obtained, therefore, addition of a coloring agent is not necessarily required. The film thus obtained is preferred to have as small a heat capacity as permissible. For this reason, the film is preferred to have as small a thickness as possible. In consideration of the film strength, the ease with which a metal is deposited on that film and the ease with which the laminate having the metal layer deposited on the film can be handled as a heat-insulation material, however, it is proper for the film to have a thickness of from 6 $\mu$ to 200 $\mu$, preferably from 10 $\mu$ to 100 $\mu$.

The heat-insulation material of the present invention is a laminate having a metal layer deposited on one surface of a film of polyfluoroolefin or fluoroolefin copolymer which is obtained as described above and which possesses not more than a 50% transmission ratio of visible ray and not less than a 30% transmission ratio of infrared ray. Deposition of a metal on one surface of such film may be accomplished by any suitable technique, for example, vacuum evaporation, plating, sputtering or printing. Alternatively, a metal sheet may be fastened to one surface of the film by using an adhesive of the type which neither absorbs heat ray nor undergoes discoloration as by the action of heat. The metal suitable for this purpose is not specifically limited. For example, silver, platinum, gold, aluminum, nickel, chromium, tin, antimony and any other proper metal may be used. It is preferable that the metal selected for use be white which provides less heat absorption than any other color. In addition, the metal layer is preferred to have a thickness sufficient to stop the passage of light and heat rays. A thickness in the range of from 500 A to several microns generally suffices. The laminate, heat-insulation material of the present invention, maybe used for covering roofs, interior and exterior walls of buildings and the interior and exterior wall surfaces of industrial apparatus and piping. This laminate, where necessary, may have its metal side adhered to a substrate sheet such as a foamed plastic sheet useful as a heat insulator or reinforcing material. In the deposition of the metal on one surface of the film, when the film is translucent and the metal layer is formed by vacuum evaporation to a very small thickness of the order of 30 A to 500 A, the metal layer will be translucent and the entire laminate will also be translucent. If such a translucent laminate is adhered to the outer surface of the glass in a building window or in an automobile window, with its metal side facing the interior, then the inhabitant of the building or the occupant of the automobile can see through the laminate but persons standing outside cannot see through.

As demonstrated in the preferred embodiments described below, the heat-insulation material of the present invention provides substantially the same effect of intercepting radiant heat as do the conventional metallized plastic films. Moreover, the heat-insulation of the present invention does not produce a glare nuisance.

EXAMPLE 1

1. Preparation of film — To 100 parts by weight of a polyvinylidene fluoride obtained by suspension polymerization were added 1, 3, 5 and 30 parts by weight of $TiO_2$ (R101 made by Du Pont), respectively. The four resultant mixtures were extruded in the form of film by means of a T-die extruder to produce white unstretched films having a thickness of 35 $\mu$. For comparison, a transparent unstretched film of polyvinylidene fluoride containing no $TiO_2$ and having a thickness of 35 $\mu$ was used.

In the accompanying drawings, FIG. 1 is a graph showing the results of the test conducted on the films for transmission ratio of rays by means of a self-registering spectrophotometer made by Hitachi Limited. In FIG. 1, the vertical axis shows the transmission ratio (%) of rays and the horizontal axis gives the wavelength (m$\mu$), respectively. Also in FIG. 1 curve 1 is for a film containing no $TiO_2$, 2 a film containing 1 part by weight of $TiO_2$, 3 a film containing 3 parts by weight of $TiO_2$, 4 a film containing 5 parts by weight of $TiO_2$ and 5 a film containing 30 parts by weight of $TiO_2$, respectively. The transmission ratio of visible ray at 6,000 A and the transmission ratio of infrared ray at 25,000 A taken as representative values from the graph are shown in Table 1 below.

Table 1

| Amount of $TiO_2$ added | Transmission ratio (%) of visible ray | Transmission ratio (%) of infrared ray |
|---|---|---|
| 0 | 85.8 | 90.1 |
| 1 | 9.8 | 85.2 |
| 3 | 1.8 | 70.5 |
| 5 | 0 | 61.0 |
| 30 | 0 | 37.2 |

On one surface of these films, aluminum was deposited to a thickness of about 0.2 $\mu$ by vacuum evaporation.

2. Determination of effect of intercepting radiant heat — A piping-grade tube of carbon steel (of the type generally used for supply of gas) measuring 100 mm in length and 2 inches in diameter was covered over its entire surface by various insulating films adhered with the aid of a chloroprene type adhesive (CS-4640 H made by Cemedyne Co.). The ends of this tube were closed with a gypsum board 10 mm in thickness.

A thermocouple was placed in contact with the outer surface of the tube approximately at its center and each film was laid over the thermocouple and covered the tube. Another thermocouple was set approximately at the center of the interior of the tube.

Figure 2:
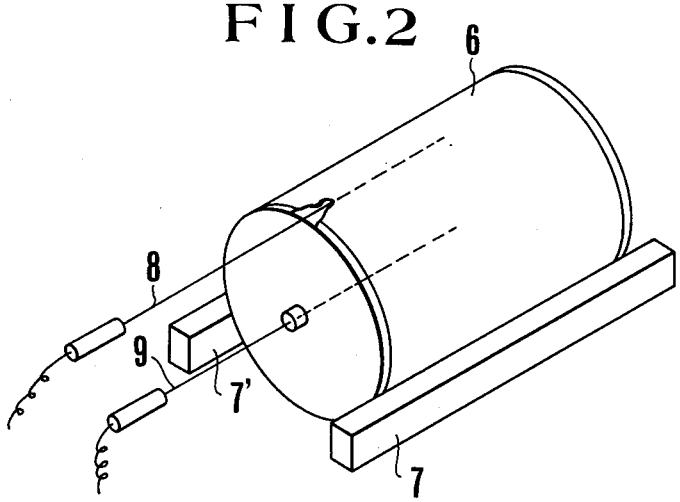
FIG. 2 represents a specific example of the procedure to be followed in the determination of the effect of heat-insulation material in intercepting radiant heat.

As illustrated in FIG. 2, the covered tube 6 obtained as described above was mounted on supports 7 and 7' made of gypsum board in such a position that with the thermocouple 8 on top. 9 is the thermocouple inside the tube.

The covered tube 6 was irradiated by an infrared ray lamp (100 V and 500 W) positioned directly above the axis of the tube at a distance of 200 mm and the temperature on the surface of the tube and the temperature at the center of the tube's interior were measured.

Figure 3:
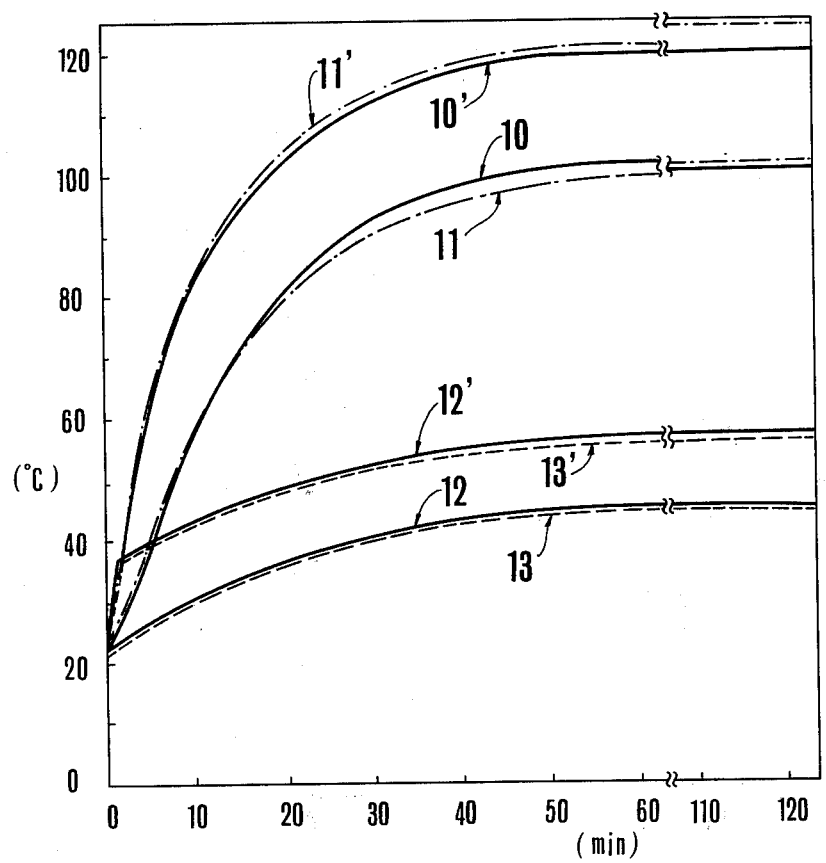
FIG. 3 is a graph showing the results of the determination carried out on various heat-insulation materials by the procedure shown in FIG. 2 with respect to the effect of insulation of radiant heat.

By the procedure explained above, each film was tested for its ability to intercept radiant heat. The films, having different $TiO_2$ contents and a fixed thickness of 35 $\mu$, were each tested for heat-insulating capability in two forms: one form had deposited on one surface thereof a coat of aluminum formed by vacuum evaporation and, in the other form, had no aluminum coating. The film in the aluminum coated form was adhered to the tube surface with the aluminum coating in contact with the tube surface. The same tube, not coated with any film, was subjected to the same test as a blank test. FIG. 3, which shows the results of the test is a graph showing the relation between the changes of temperature on the surface and temperature at the center of the tube interior and the duration of irradiation of infrared ray, after the irradiation with the infrared ray lamp. In FIG. 3, the vertical axis represents temperature (° C) and the horizontal axis represents duration of irradiation of infrared ray (in minutes). Also in FIG. 3, 10 denotes the changes of temperature at the center of the interior of the tube not covered with any film and 10' the changes of temperature on the outer surface of the tube having no film covering. 11 denotes the changes of temperature at the center of the interior of the tube covered with a film containing 3 parts by weight of $TiO_2$, 11' the changes of temperature on the surface of the same tube. 12 denotes the changes of temperature at the center of the interior of the tube covered with a film having one surface coated with a vacuum-evaporation deposited aluminum layer and containing 3 parts by weight of $TiO_2$ and 12' the changes of temperature on the surface of the same tube. 13 denotes the changes in temperature at the center of the interior of the tube coated with an ordinary metallized plastic film having a vacuum-evaporated aluminum layer and containing no $TiO_2$, and 13' the changes of temperature on the surface of that tube. It is clearly seen from FIG. 3 that after about 60 minutes of irradiation with the infrared ray lamp, the temperatures measured at different points invariably levelled off. This indicates that the effect of heat-insulation can be confirmed by studying the temperature measured after lapse of about 60 minutes.

3. Results — The results of the test described above were as shown in Table 2 below. In the case of films having the same $TiO_2$ content, the film having a vacuum-evaporated aluminum layer exhibited a decidedly higher heat-insulating effect than the film lacking such a layer. Where the films having an aluminum layer contained no $TiO_2$, they presented mirror faces of metallic gloss. In none of the films having an aluminum layer and containing $TiO_2$, even as little as 1 part by weight, was metallic glare observed on the surface. Instead, these films presented a white appearance. When a beam of light was impinged upon their surfaces, no scintillating reflection was observed.

Table 2

| Amount of $TiO_2$ added (parts by weight) | Al layer by vacuum evaporation | Temperature in the interior of tube (° C) | Temperature on the surface of tube (° C) | Classification |
|---|---|---|---|---|
| 0 | None | 114 | 134 | Control |
| 0 | Present | 44 | 55 | Control |
| 1 | None | 110 | 133 | Control |
| 1 | Present | 44 | 56 | Present invention |
| 3 | None | 102 | 124 | Control |
| 3 | Present | 45 | 57 | Present invention |
| 30 | None | 85 | 102 | Control |
| 30 | Present | 50 | 67 | Present invention |
| Only tube | | 102 | 121 | Blank |

The tube coated with the film containing 3 parts by weight of $TiO_2$ and having on one surface a vacuum-evaporated aluminum layer was exposed to outdoor conditions for three months. After this outdoor exposure test, the tube was again subjected to the same test as described above. In this test, the changes of temperature in the interior and on the surface were substantially the same as in the test performed prior to the outdoor exposure test.

EXAMPLE 2

Representative films prepared by way of test specimens in Example 1 were tested for reflective power. The measurement of reflection of light was made by using a gloss meter made by Toyo Seiki Seisakusho. First, a sample film was attached to a coarse surface of a metal substrate board and mounted on the sample support in the gloss meter in such a position that the beam of light of the light source impinged on the sample film at an angle of 60°. The beam of light reflected by the sample film at an angle of 120° was allowed to enter the light receiver (using CdS as the light receiving element) of the meter and measured for illumination.

An aluminum foil was used as the standard. This aluminum foil was attached to the surface of substrate board and the gloss meter was adjusted so that the scale gave 95% of reading of illumination of the foil. Under the same conditions for the gloss meter, the sample films were measured for illumination. The results of the test were as shown in Table 3 below.

Table 3

| | Amount of $TiO_2$ added | Al layer | Scale reading of illumination (%) |
|---|---|---|---|
| Metal substrate board | — | — | 0.5 |
| Aluminum foil | — | — | 95 |
| Polyvinylidene fluoride | 0 | None | 20 |
| Polyvinylidene fluoride | 0 | Present | 80 |
| Polyvinylidene fluoride | 1 | Present | 22 |
| Polyvinylidene fluoride | 3 | Present | 20 |
| Polyvinylidene fluoride | 3 | None | 15 |
| Polyvinylidene fluoride | 30 | None | 15 |

EXAMPLE 3

A biaxially stretched film having a thickness of 18 $\mu$ was produced from a mixed composition consisting of 1 part by weight $TiO_2$ and 100 parts by weight of a copolymer obtained by copolymerizing 90 parts by weight of vinylidene fluoride, 5 parts by weight of ethylene tetrafluoride and 5 parts by weight of vinyl fluoride. On one surface of the film, aluminum was deposited by vacuum evaporation to a thickness of about 200 A.

The film having the vacuum-evaporated metal layer was adhered with a polyurethanic adhesive to the outer surface of one glass pane in a window, with the metal layer facing inside. With the sunlight falling directly on the window, a thermometer was positioned in the path of the sunlight behind a glass pane not covered with the film and another thermometer was positioned behind the film-coated glass pane in the path in which the sunlight would have travelled if it had not been intercepted by the film. The temperature on the former thermometer was 40.5° C and that on the latter thermometer was 31.3° C. The room temperature, when measured at the same time in the shaped portion of the room, was found to be 28.2° C.

When the light reflected from the glass panes was observed from outside the room, the reflection from the film-coated glass pane appeared to be slightly weaker than that from the glass pane having no film coating.

During daylight, a person standing inside the room could see through the film-coated glass pane whereas a person standing outside the room could not see inside through the same glass pane.

What is claimed is:

1. A heat-insulation laminate comprising:
   a. a layer of a film of polyfluoroolefin or fluoroolefin copolymer having not more than a 50% transmission ratio of visible ray and not less than a 30% transmission ratio of infrared ray, said film of polyfluoroolefin or fluoroolefin copolymer containing from 0.5 to 50 parts by weight, based on 100 parts by weight of said polyfluoroolefin or fluoroolefin copolymer, of a filler selected from the group consisting of titanium dioxide, zinc oxide, aluminum oxide, calcium carbonate, gypsum, magnesium oxide and calcium sulfite; and
   b. a layer of metal on one surface of said film, said metal layer having a thickness of from 30 A to several microns.

2. The laminate of claim 1, wherein said film of polyfluoroolefin or fluoroolefin copolymer has a thickness in the range of from 6 $\mu$ to 200 $\mu$.

3. The laminate of claim 1, wherein said polyfluoroolefin is a polymer obtained by polymerizing at least one fluoroolefin selected from the group consisting of vinyl fluoride, vinylidene fluoride, ethylene trifluoride, ethylene tetrafluoride, vinylidene fluorochloride, ethylene difluorochloride, ethylene trifluorochloride and propylene hexafluoride.

4. The laminate of claim 1, wherein said polyfluoroolefin is polyvinyl fluoride, polyvinylidene fluoride, polyethylene tetrafluoride or polyethylene trifluorochloride.

5. The laminate of claim 1, wherein said polyfluoroolefin is a polymer obtained by polymerizing not less than 85% by weight of vinylidene fluoride with the balance of at least one fluoroolefin selected from the group consisting of vinyl fluoride, ethylene trifluoride, ethylene tetrafluoride, vinylidene fluorochloride, ethylene difluorochloride, ethylene trifluorochloride and propylene hexafluoride.

6. The laminate of claim 1, wherein said fluoroolefin copolymer is a copolymer obtained by polymerizing at least one fluoroolefin with at least one other monomer.

7. The laminate of claim 1, wherein said fluoroolefin copolymer is an ethylene tetrafluoride-ethylene copolymer or a vinylidene fluoride-ethylene copolymer.

8. The laminate of claim 1, wherein said metal is silver, platinum, gold, aluminum, nickel, chromium, tin or antimony.

9. A translucent laminate according to claim 1 wherein said metal layer has a thickness on the order of from 30 A to 500 A.

10. The laminate of claim 1 wherein said filler is white.

* * * * *